United States Patent Office 3,169,866
Patented Feb. 16, 1965

3,169,866
SYNTHETIC FILM MATERIALS AND SAME WITH LIGHT-SENSITIVE SILVER HALIDE EMULSIONS COATED THEREON
Edward William Lee, Ilford, and Margaret London Clachan, Manningtree, England, assignors to Ilford Limited, Ilford, England, a British company
No Drawing. Filed May 13, 1963, Ser. No. 280,127
Claims priority, application Great Britain, May 25, 1962, 20,290/62
16 Claims. (Cl. 96—87)

This invention relates to synthetic film materials, and more particularly to film base materials of use in the production of photographic materials.

Self-supporting films formed of synthetic linear polycarbonates and of polymers containing both carbonate and urethane linkages may be prepared with mechanical and physical and chemical properties which render them very suitable indeed as base materials on which are coated silver halide photographic emulsion layers for the production of photographic film materials.

Suitable polycarbonates may be made by reacting di-(monohydroxyphenyl) alkanes, in which both hydroxy phenyl groups are attached to the same carbon atoms of the alkane, with carbonic acid diesters, phosgene or bis-chloro-carbonic acid esters of di(monohydroxyphenyl) alkanes in which both hydroxyphenyl groups are attached to the same carbon atom of the alkane. These methods, and the materials suitable for use therein, are described in British Patent No. 772,627 and later patents.

Polymers which include both carbonate and urethane linkages may be obtained by reacting a said di-(monohydroxyphenyl) alkane with phosgene and simultaneously or subsequently bringing into the reaction a diamine of the formula $R_1NH$—$R$—$NHR_2$ where $R_1$ and $R_2$ are hydrogen or alkyl, and $R$ is divalent alkylene, arylene or cycloalkylene. A preferred method, however, is that described in British Patent No. 918,046 wherein a polyurethane having free hydroxy end groups attached directly to a nuclear carbon atom of an aromatic nucleus is reacted with a dihydroxy compound in which the —OH groups are directly attached to a nuclear carbon atom of an aromatic nucleus and with phosgene, e.g. by reacting 4,4'-di-isocyanate-diphenyl methane with 4,4'-dihydroxy diphenyl-2,2-propane to form a polyurethane, and reacting this with further 4,4'-dihydroxy diphenyl-2,2-propane and phosgene.

However, since film base materials made of such polymers are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so-called "subbing" layers) between the film base and the emulsion layer, but the materials hitherto suggested for this purpose in connection with other types of film base have not proved satisfactory when applied to film base of synthetic linear polycarbonates or of polymers containing both carbonate and urethane linkages, which are of highly hydrophobic character.

According to the present invention there is provided a film base material consisting of a film of synthetic linear polycarbonate, or of a polymer containing both carbonate and urethane linkages, and which is of highly hydrophobic character, having superimposed thereon, in order, (1) a layer directly adherent to said film and consisting essentially of a vinyl chloride-acetate copolymer, a vinyl chloride-acetate-dicarboxylic acid copolymer, or a partially hydrolysed vinyl chloride-acetate copolymer, and (2) a layer consisting essentially of a methyl methacrylate-itaconic acid copolymer and gelatin adherent to said layer (1). Optionally layer (1) may also contain a copolymer of methyl methacrylate with itaconic acid containing free carboxyl groups.

Such a film base material accepts a gelatin-containing layer on layer (2) and the gelatin layer is strongly adherent thereto so that the whole assembly is highly resistant to peeling or frilling of the layers when handled in photographic processing baths.

Resins particularly suitable for layer (1) are vinyl chloride-acetate copolymers which contain from 60–95% vinyl chloride, 5–40% vinyl acetate and 0–5% of a dicarboxylic acid.

Layer (1) may also consist essentially of a vinyl chloride-acetate copolymer which is partially hydrolysed so that it contains some free hydroxy groups. Preferably the analysis of the product should show vinyl chloride about 85–95%, vinyl acetate about 2 to 5% and polyvinyl alcohol about 5 to 10%. A very suitable product for use is one containing vinyl chloride 91%, vinyl acetate 3%, and vinyl alcohol 6% and is available commercially as Vinylite VAGH. Similar products are sold under the trademarks Vinylite VMCH, VYNH, VYLF and VYNS.

Layer (1) may also include a copolymer of methyl methacrylate with itaconic acid, and preferably one which has an acid value of about 80–120, preferably 90–100 mg. KOH/gm. The itaconic acid resins may be made by copolymerisation in acetone solution with benzoyl peroxide as catalyst. Thus for example:

| | | |
|---|---|---|
| Methyl methacrylate | ml__ | 890 |
| Itaconic acid | gm__ | 320 |
| Benzoyl peroxide | gm__ | 15 |
| Acetone | ml__ | 1200 | are polymerised for 18 hours at 65° C.

Layer (2) contains a methyl methacrylate/itaconic acid polymer, e.g. one as just described, together with gelatin.

According to a further feature of the said invention a product as defined above is prepared by successively coating a said polycarbonate or polycarbonate-polyurethane film material with the constituents of layers (1) and (2), each dissolved in a volatile solvent medium, the first layer being dried before the second is applied.

In the production of layer (1) the resin is preferably dissolved in a solvent medium containing acetone, an acetone-toluene mixture, methylene chloride, acetone-carbon tetrachloride mixtures or the like, since such solvents have usually some slight swelling action on the film material and this assists in keying layer (1) to the film material. The constituents of layer (2) may conveniently be applied from solution in solvent medium containing a lower ketone, such as acetone or methylethylketone, or containing methanol.

A further improvement may be effected in the products of the invention, especially in regard to the resistance of the products to interlayer breakdown when immersed in acetone, by including in layer (1) a small proportion of an alkyl ester of orthotitanic acid, preferably tetraisopropyl titanate, or of zirconic acid, or by the inclusion of a di-isocyanate or a precursor for a di-isocyanate, or pyromellitic anhydride, by which means a cross-linking of the polymer in layer (1) is effected. Suitable proportions of such cross-linking agents are from 2 to 25% by weight of the resin in layer (1).

The following examples will serve to illlustrate the invention:

*Example 1*

The following coatings are applied to film based on synthetic linear polycarbonate or polycarbonate-polyurethane.

First coating:

| | | |
|---|---|---|
| Vinylite VAGH | gm | 2 |
| Acetone | ml | 20 |
| Carbon tetrachloride | ml | 80 |
| Ethyl lactate | ml | 3 | dried 10 minutes at room temperature.

Second coating:

| | | |
|---|---|---|
| Gelatin | gm | 1.0 |
| Methyl methacrylate-itaconic acid resin, acid value 80–120 | gm | 0.87 |
| Salicylic acid | gm | 0.2 |
| Water | ml | 2 |
| Methanol | ml | 48 |
| Acetone | ml | 50 |
| Chromium chloride, 1% in methanol | ml | 1 |
| Ethyl lactate | ml | 2 |

The thus-coated film was aged for 30 minutes at 100–120° C.

The photographic gelatino silver halide coating was applied over the second coating in conventional manner. The adhesion of the layers was found to be excellent during the usual photographic processing sequence.

*Example 2*

The procedure of Example 1 was followed except that in the first coating 10 ml. of a 5% solution of tetraisopropyl titanate in isopropyl alcohol was added to the solution. After a photographic gelatin silver halide coating was applied in the usual way, the resulting film was tested by immersing the water-wet, emulsion-coated, film in acetone and the adhesion of the layers was found to be excellent.

*Example 3*

The procedure of Example 2 was followed except that Vinylite VMCH was used instead of Vinylite VAGH, and similar excellent results were obtained.

*Example 4*

The procedure of Example 1 was followed but with the addition of 0.25 gm. of 2,4-tolylene di-isocyanate to layer (1). The resulting product was strongly resistant to interlayer separation, both on conventional processing and on immersion in acetone.

We claim as our invention:

1. A film base material consisting of a film of synthetic linear polymer of highly hydrophobic character selected from the class consisting of polycarbonate and polymer containing both carbonate and urethane linkages, having superimposed thereon in order (1) a layer directly adherent to said film and consisting essentially of a copolymer selected from the class consisting of hydroxy-free vinyl chloride-vinyl acetate copolymer, hydroxy-free vinyl chloride-vinyl acetate-vinyl alcohol dicarboxylic acid ester copolymer and partially hydrolyzed vinyl chloride-vinyl acetate copolymer and layer (2) consisting essentially of a mixture of methyl methacrylate-itaconic acid copolymer and gelatin.

2. A film base material consisting of a film of synthetic linear polymer of highly hydrophobic character selected from the class consisting of polycarbonate and polymer containing both carbonate and urethane linkages, having superimposed thereon in order (1) a layer directly adherent to said film and consisting essentially of a copolymer selected from the class consisting of hydroxy-free vinyl chloride-vinyl acetate copolymer, hydroxy-free vinyl chloride-vinyl acetate-vinyl alcohol dicarboxylic acid ester copolymer and partially hydrolyzed vinyl chloride-vinyl acetate copolymer and also containing a copolymer of methyl methacrylate with itaconic acid containing free carboxyl groups, and layer (2) consisting essentially of a mixture of methyl methacrylate-itaconic acid copolymer and gelatin.

3. A film base material consisting of a film of synthetic linear polymer of highly hydrophobic character selected from the class consisting of polycarbonate and polymer containing both carbonate and urethane linkages, having superimposed thereon in order (1) a layer directly adherent to said film and consisting essentially of a copolymer selected from the class consisting of hydroxy-free vinyl chloride-vinyl acetate copolymer, hydroxy-free vinyl chloride-vinyl acetate-vinyl alcohol dicarboxylic acid ester copolymer and partially hydrolyzed vinyl chloride-vinyl acetate copolymer and also containing a cross linking agent, and layer (2) consisting essentially of a mixture of methyl methacrylate-itaconic acid copolymer and gelatin.

4. A film base material consisting of a film of synthetic linear polymer of highly hydrophobic character selected from the class consisting of polycarbonate and polymer containing both carbonate and urethane linkages, having superimposed thereon in order (1) a layer directly adherent to said film and consisting essentially of a copolymer selected from the class consisting of hydroxy-free vinyl chloride-vinyl acetate copolymer, hydroxy-free vinyl chloride-vinyl acetate-vinyl alcohol dicarboxylic acid ester copolymer and partially hydrolyzed vinyl chloride-vinyl acetate copolymer and also containing a copolymer of methyl methacrylate with itaconic acid containing free carboxyl groups and a cross-linking agent and layer (2) consisting essentially of a mixture of methyl methacrylate-itaconic acid copolymer and gelatin.

5. A film base material according to claim 1 wherein the said copolymer of layer (1) consists essentially of 60–95% vinyl chloride, 5–40% vinyl acetate and 0–5% dicarboxylic acid ester component by weight.

6. A film base material according to claim 1 wherein the said copolymer of layer (1) consists essentially of 85–95% vinyl chloride, 2–5% vinyl acetate and 5–10% vinyl alcohol by weight.

7. A film base material according to claim 1 wherein the said copolymer of layer (1) consists essentially of 91% vinyl chloride, 3% vinyl acetate and 6% vinyl alcohol by weight.

8. A film base material according to claim 1 wherein the said copolymer of layer (2) has an acid value of 80–120 mg. KOH/gm. of polymer.

9. A film base material according to claim 2 wherein the copolymer of methyl methacrylate and itaconic acid contained in layer (1) has an acid value of 80–120 mg. KOH/gm. of polymer.

10. A film base material according to claim 3 wherein from 2–25% by weight of cross-linking agent is included in layer (1).

11. A film base material according to claim 3 wherein the cross-linking agent is an alkyl ester of orthotitanic acid.

12. A film base material according to claim 3 wherein the cross-linking agent is tetraisopropyl titanate.

13. A film product wherein the film base material consists of a film of synthetic linear polymer of highly hydrophobic character selected from the class consisting of polycarbonate and polymer containing both carbonate and urethane linkages, having superimposed thereon in order (1) a layer directly adherent to said film and consisting essentially of a copolymer selected from the class consisting of hydroxy-free vinyl chloride-vinyl acetate copolymer, hydroxy-free vinyl chloride-vinyl acetate-vinyl alcohol dicarboxylic acid ester copolymer and partially hydrolyzed vinyl chloride-vinyl acetate copolymer and layer (2) consisting essentially of a mixture of methyl methacrylate-itaconic acid copolymer and gelatin and having superimposed on layer (2) a gelatino silver halide emulsion layer.

14. A film product wherein the film base material consists of a film of synthetic linear polymer of highly hydrophobic character selected from the class consisting of polycarbonate and polymer containing both carbonate and urethane linkages, having superimposed thereon in order (1) a layer directly adherent to said film and consisting essentially of a copolymer selected from the class consisting of hydroxy-free vinyl chloride-vinyl acetate copolymer, hydroxy-free vinyl chloride-vinyl acetate-vinyl alcohol dicarboxylic acid ester copolymer and partially hydrolyzed vinyl chloride-vinyl acetate copolymer and also containing a copolymer of methyl methacrylate with itaconic acid containing free carboxyl groups, and layer (2) consisting essentially of a mixture of methyl methacrylate-itaconic acid copolymer and gelatin and having superimposed on layer (2) a gelatino-silver halide emulsion layer.

15. A film product wherein the film base material consists of a film of synthetic linear polymer of highly hydrophobic character selected from the class consisting of polycarbonate and polymer containing both carbonate and urethane linkages, having superimposed thereon in order (1) a layer directly adherent to said film and consisting essentially of a copolymer selected from the class consisting of hydroxy-free vinyl chloride-vinyl acetate copolymer, hydroxy-free vinyl chloride-vinyl acetate-vinyl alcohol dicarboxylic acid ester copolymer and partially hydrolyzed vinyl chloride-vinyl acetate copolymer and also containing a cross linking agent, and layer (2) consisting essentially of a mixture of methyl methacrylate-itaconic acid copolymer and gelatin and having superimposed on layer (2) a gelatino-silver halide emulsion layer.

16. A film product wherein the film base material consists of a film of synthetic linear polymer of highly hydrophobic character selected from the class consisting of polycarbonate and polymer containing both carbonate and urethane linkages, having superimposed thereon in order (1) a layer directly adherent to said film and consisting essentially of a copolymer selected from the class consisting of hydroxy-free vinyl chloride-vinyl acetate copolymer, hydroxy-free vinyl chloride-vinyl acetate-vinyl alcohol dicarboxylic acid ester copolymer and partially hydrolyzed vinyl chloride-vinyl acetate copolymer and also containing a copolymer of methyl methacrylate with itaconic acid containing free carboxyl groups and a cross-linking agent and layer (2) consisting essentially of a mixture of methyl methacrylate-itaconic acid copolymer and gelatin and having superimposed on layer (2) a gelatino silver halide emulsion layer.

No references cited.

NORMAN G. TORCHIN, *Primary Examiner.*